April 8, 1952  M. R. HUTCHINSON, JR  2,592,285
FILM TRANSPORT MEANS FOR MOTION-PICTURE PROJECTORS
Filed Dec. 28, 1946
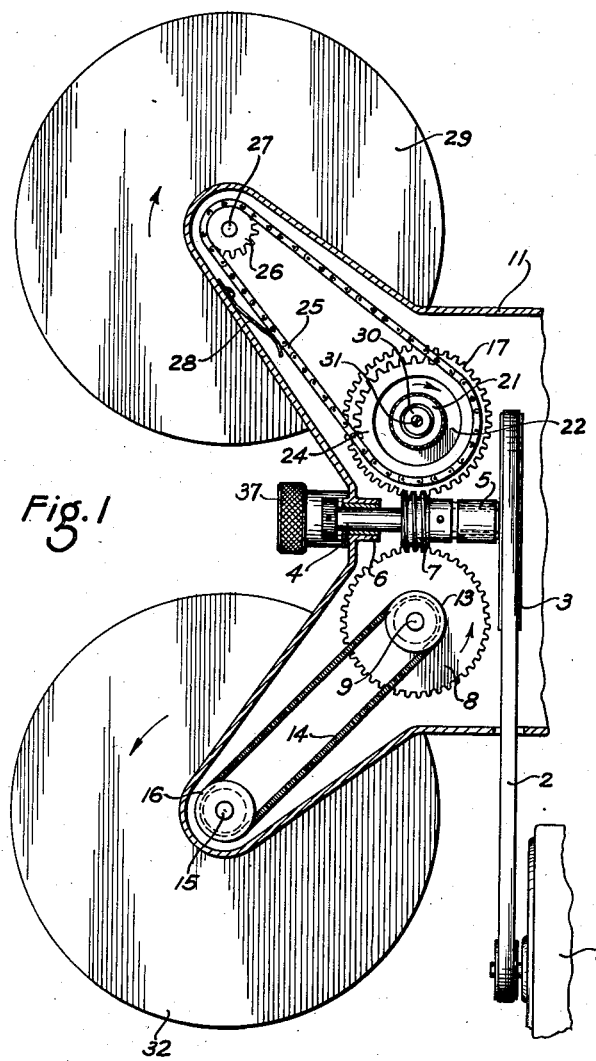
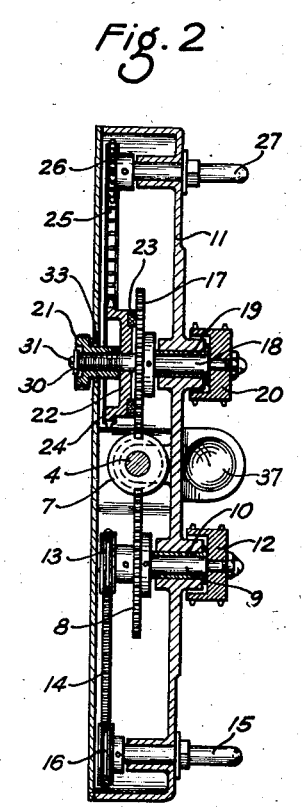
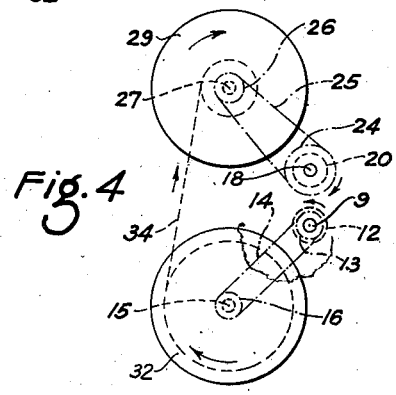
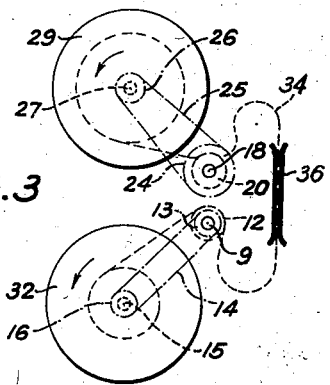
Miller R. Hutchison Jr.
INVENTOR
BY
ATTORNEYS Patented Apr. 8, 1952

2,592,285

UNITED STATES PATENT OFFICE 2,592,285

FILM TRANSPORT MEANS FOR MOTION-PICTURE PROJECTORS

Miller R. Hutchison, Jr., Rochester, N. Y., assignor to Eastman Kodak Company, Rochester, N. Y., a corporation of New Jersey Application December 28, 1946, Serial No. 718,991

9 Claims. (Cl. 242—55)

1

The present invention relates to motion picture projectors and, more specifically, to film transport means for motion picture projectors which is especially adapted to facilitate the rewinding of the film after projection with the greatest dispatch and safety to the film and with a minimum number of previously required operations such as the manipulation of belts and the interchange of reels.

In amature motion picture projectors the film is generally transported by sprockets from a supply reel through a film gate to a takeup reel. Subsequently it is necessary that the film be wound back upon the supply reel. This is performed on the same machine or projector, the film being made to bypass the gate and the power for the operation being supplied by the projector motor itself. It is desirable that such a motion picture machine be so designed that its operation does not require the manipulation of belts or pulleys or the interchange of film reels. Since it is also desirable that the rewinding be performed at a considerably greater speed than the projection of the film, it is not only necessary that different gear and/or pulley ratios be employed, but that the power transmission from motor to rewind spindle be positive in its operation, or without appreciable slippage. Moreover, the means employed to insure such positive operation during rewinding should be readily and automatically releasable in the event that projection is resumed, if damage to the film is to be avoided. This is an especially important consideration in projectors designed for use with 8 mm. film because of the relative flimsiness of such film.

It is, therefore, an object of the present invention to provide a motion picture apparatus having an improved film transport means.

It is a further object of this invention to provide an improved motion picture projector on which the film, after projection, may be rewound upon the supply reel without preliminary manipulation of drive belts or interchange of film reels.

It is a still further object of this invention to provide an improved motion picture projector which includes a substantially positive power transmission between the driving mechanism and the supply reel spindle for rewinding the film, which positive transmission is automatically releasable upon the resumption of projection of the film or when the film becomes unduly stressed during projection.

It is a still further object of this invention to provide an improved motion picture apparatus of the character herein described which is simple in construction, relatively inexpensive, and fool-proof in its operation.

Other objects and advantages of the invention will become apparent from the following description taken in connection with the accompanying drawing, and it will be understood that many changes may be made in the details of construction and arrangement of parts shown and described without departing from the spirit of the invention as expressed in the accompanying claims. I, therefore, do not wish to be limited to the exact details shown and described as the preferred form only has been shown by way of illustration.

In the drawing:

Figure 1 is a side view, partly in section, of a film transport means for a motion picture projector which embodies the present invention;

Figure 2 is an end view, also partly in section, of the same embodiment;

Figure 3 is a diagrammatic view illustrating the threading of the film through the film transport means during projection of the film; and Figure 4 is a similar view showing the threading of the film through the device during the rewinding of the film.

The motion picture projector film transport means illustrated in Figures 1 and 2 comprises an electric motor 1 which drives the pulley 3 through the belt 2. The pulley 3 is mounted upon the shaft 4 which actuates the shutter and film pull-down mechanism of a conventional amateur film projector. This shaft is journalled by the bearings 5 and 6 in the housing 11 for the film transport mechanism. The housing 11 functions not only as a supporting structure for the various elements of the transport mechanism but by enclosing the various moving elements assures greater safety as well as improves the over-all appearance of the apparatus. The shaft 4 mounts and drives a worm 7 which meshes with the worm gears 8 and 17. The worm gear 8 is fixedly secured to the shaft 9 which is journalled in the bearing 10 in the wall of the housing 11. Mounted on the shaft 9 within the housing is a pulley 13 which drives the film takeup reel spindle 15 through the belt 14 and a second pulley 16 mounted on the spindle which is journalled in the housing 11. The belt 14 connects the pulleys 13 and 16 by making frictional engagement therewith and is preferably of the coil spring variety. Also mounted on the shaft 9, but outside of the housing 11, is the film sprocket 12 which assists in transporting the film during projection through the film gate 36 which is aligned optically with the projector objective 37.

The worm gear 17 mounted upon the shaft 18 is also meshed with the worm 7, worm gears 8 and 17 engaging the worm at diametrically opposite sides thereof whereby the gears are driven in opposite directions. The shaft 18, like the shaft 9, is journalled in a bearing 19 in the wall of the housing 11. A film sprocket 20 mounted on one end of the shaft 18 outside of the housing cooperates with the sprocket 12 in moving the film during projection through the film gate 36. The film sprockets are positively engaged to the shaft 4; their rotation is, therefore, at all times synchronized with the operation of the shutter and film pull-down mechanism (not shown). The opposite end of the shaft 18 is threaded to engage an internally-threaded knob 21. The threaded end of the shaft extends through an aperture 33 in the housing, the knob engaged by the shaft having a portion which extends outside of the housing to be grasped for manual operation of the rewind clutch 22, as will be described below. The knob is made captive on the shaft by the washer 30 which is fastened to the shaft 18 by a screw 31 or equivalent means. The rewind clutch 22 includes the plate element or sprocket 24 which is rotatably mounted on the shaft 18 and a frictional facing in the form of a washer 23. The knob 21 upon being rotated (clockwise, as viewed in Figure 1) bears against the clutch sprocket 24, moving it axially along the shaft 18 until the sprocket makes frictional contact with the face of the worm gear 17 by means of the interposed frictional facing or washer 23. A film supply reel spindle 27 is journalled in a wall of the housing 11 and fixedly mounts thereon within the housing a sprocket 26. A positive drive means, such as the chain 25, connects the sprockets 24 and 26, whereby the rotation of the worm gear 17 imparted to the clutch sprocket 24 drives the supply reel spindle. A leaf spring 28, or equivalent means, bears against the chain 25 to take up chain slack and to offer some frictional resistance to movement. The spindles 27 and 15 have portions extending outside of the housing upon which are mounted, respectively, the supply reel 29 and the takeup reel 32.

When it is desired to project, the film 34 is threaded between the reels 29 and 32, between the sprockets 20 and 12, and through the film gate 36. It is preferable before projecting to fully disengage the clutch 22 manually whereby the spindle 27 will be relatively free-running, the only opposition thereto being the friction inherent in the several moving elements to which it is positively connected and the leaf spring 28. However, should the clutch not be manually disengaged, it will be released automatically as the film becomes unduly stressed by the operation of the torque developed by the over-stressed film. In such an event as soon as the machine is started, the upper film sprocket 20 draws film from the supply reel 29 causing the latter to rotate counterclockwise which is opposed to the normal rotation of the spindle 27 when driven by the worm gear 17 and the clutch mechanism. Rotation of the supply reel when driven by the film thus opposes the pull of the chain 25 and produces a torque which is applied to the clutch causing it to slip, thereby loosening the knob 21 on the shaft 18 by a counterclockwise rotation of the knob. The clutch is thus fully disengaged from the worm gear 17 preventing any possible damage to the film or the projector mechanism. The knob is precluded from leaving the shaft by the means 30 and 31, described above. The film after projection is wound upon the takeup reel which is frictionally driven by the belt 14.

When it is desired to rewind the film, it is threaded as illustrated in Figure 4, the film sprockets 20 and 12 and the film gate 36 being bypassed. The rewind clutch is engaged manually by tightening the knob 21. Since the worm drive is irreversible the shaft 18 will not be caused to rotate by turning the knob. When the motor 1 is started, the power to rewind the film from the takeup reel 32 is transmitted from the worm gear 17 through the clutch sprocket 24 and the positive drive 25 to the supply reel spindle, the rotation of which rewinds the film 34 upon the supply reel 29. During rewinding the rotation of the takeup reel spindle is opposed to the normal rotation of that spindle and the frictional drive 14 will, therefore, slip. This opposition provides a desirable amount of film tension to prevent the film from overrunning the takeup reel. The clutch sprocket 24 is of a greater diameter than the sprocket 26 in order that rewinding may proceed at a greater speed than projection. Since the drive between the sprockets 24 and 26 is of the positive type, there will be no appreciable slippage unless an overload condition arises. This positive drive also makes for greater speed in rewinding. Should an overload condition arise, the clutch will release automatically, its operation being substantially identical with what occurs when projection of the film is resumed without the operator first having manually released the clutch by rotation of the knob 21. From the foregoing it is apparent that the handedness or direction of rotation of the thread on the threaded end of the shaft 18 must be such that the torque developed by the film, as it becomes stressed, will tend to operate through the chain 25 and clutch 22 to back the knob 21 toward the end of the shaft thereby automatically releasing the clutch sprocket from its frictional engagement with the rotating worm gear 17.

From the foregoing description it will be apparent that I have provided means for obtaining all of the objects and advantages of this invention.

What I claim and desire to secure by Letters Patent of the United States is:

1. A film transport means comprising a pair of rotatable shafts, one end of one of which is threaded, a gear fixedly mounted on each shaft, means for simultaneously driving said gears in opposite directions, a supply reel spindle and a takeup reel spindle, a clutch including a sprocket rotatably mounted on the shaft having the threaded end, said sprocket having a frictional facing for engaging the gear mounted upon that shaft, an internally-threaded element threaded upon the threaded end of said shaft, the rotation of which element in the same direction in which said threaded shaft is adapted to be driven by the gear mounted thereon causes it to travel axially along the shaft toward said gear and to bear against the sprocket to move it axially along the shaft into frictional engagement with said gear, a second sprocket secured on said supply reel spindle, positive drive means connecting said clutch sprocket and said supply reel spindle sprocket, a pulley secured on the shaft mounting the other of said gears, a second pulley secured to the takeup reel spindle, and a belt in frictional engagement with and connecting said pulleys.

2. A film transport means comprising a pair of rotatable shafts, one end of one of which is threaded, a gear secured on each shaft, means for simultaneously driving said gears in opposite directions, a supply reel spindle and a takeup reel spindle, a clutch including a plate element rotatably mounted on the shaft having the threaded end and adapted to frictionally engage the gear secured on that shaft, a knob threaded upon the threaded end of said shaft, rotation of which knob in the same direction in which said threaded shaft is adapted to be driven by the gear secured thereon causes it to travel axially along the shaft toward said gear and to bear against the plate element to move it axially along the shaft into frictional engagement with said gear, positive drive means connecting said plate element and said supply reel spindle, a pulley secured on the shaft mounting the other of said gears, a second pulley secured to the takeup reel spindle, and a belt in frictional engagement with and connecting said pulleys.

3. A motion picture apparatus comprising a supporting structure, a shaft journalled in the supporting structure, a worm fixedly secured on the shaft, means for driving the shaft, two other shafts journalled in the supporting structure, one end of one of which is threaded, a worm gear fixedly secured to each of the said other shafts, both worm gears simultaneously engaging said worm whereby the gears are caused to rotate in opposite directions, a supply reel spindle and a takeup reel spindle journalled in the supporting structure, a clutch including a sprocket rotatably mounted on the shaft having the threaded end, said sprocket having a frictional facing for engaging the worm gear secured on that shaft, a knob threaded upon the threaded end of said shaft, rotation of which knob in the same direction in which said threaded shaft is adapted to be rotated by the gear secured thereon causes it to travel axially along the shaft toward said gear and to bear against the sprocket to move it axially along the shaft into frictional engagement with said gear, a second sprocket secured on the supply reel spindle, positive drive means connecting said clutch sprocket and said supply reel spindle sprocket, a pulley secured on the shaft mounting the other of said worm gears, a second pulley secured to the takeup reel spindle, and a belt in frictional engagement with and connecting said pulleys.

4. A motion picture apparatus comprising a supporting structure, a shaft journalled in the supporting structure, a worm fixedly secured on the shaft, means for driving the shaft, two other shafts journalled in the supporting structure, one end of one of which is threaded, a worm gear and a film sprocket fixedly secured on each of said other shafts, both worm gears simultaneously engaging said worm whereby the gears are caused to rotate in opposite directions, a supply reel spindle and a takeup reel spindle journalled in the supporting structure, a clutch including a plate element rotatably mounted on the shaft having the threaded end, said plate element having a frictional facing for engaging the gear secured on that shaft, a knob threaded upon the threaded end of said shaft, the rotation of the knob in the same direction in which said threaded shaft is adapted to be rotated by the gear secured thereon causing it to travel axially along the shaft toward said gear and to bear against the plate element to move it axially along the shaft into frictional engagement with said gear, positive drive means connecting said plate element and said supply reel spindle, a pulley secured on the shaft mounting the other of said gears, a second pulley secured on the takeup reel spindle, and a belt in frictional engagement with and connecting said pulleys.

5. A film transport means comprising a supporting structure, a pair of shafts journalled in said supporting structure, one of said shafts having a threaded end, a gear fixedly secured on each shaft, means for simultaneously driving said gears in opposite directions, a supply reel spindle and a takeup reel spindle journalled in said supporting structure, a clutch including a sprocket rotatably mounted on the shaft having the threaded end, said sprocket having a frictional facing for engaging the gear mounted on that shaft, a knob threaded upon the threaded end of said shaft and means to make it captive thereon, rotation of said knob in the same direction in which said threaded shaft is adapted to be driven by the gear secured thereon causing it to travel axially along the shaft toward said gear and to bear against the sprocket to move it axially along the shaft into frictional engagement with said gear, a second sprocket fixedly secured on said supply reel spindle, positive drive means connecting said clutch sprocket and said supply reel spindle sprocket, a pulley fixedly secured on the other shaft which mounts the other of said gears, a second pulley fixedly secured to the takeup reel spindle, and a belt in frictional engagement with and connecting said pulleys.

6. A motion picture apparatus comprising a housing, a shaft journalled in a wall of the housing, a worm secured on the shaft within the housing, means for driving the shaft, two other shafts journalled in a wall of the housing, one end of one of which is threaded, a film sprocket secured on each of said other shafts outside of said housing, a worm gear secured on each of said other shafts within the housing, both gears simultaneously engaging said worm whereby the gears are caused to rotate in opposite directions, a supply reel spindle and a takeup reel spindle journalled in a wall of the housing and having reel-receiving portions projecting outside of said housing, a clutch including a sprocket rotatably mounted within the housing on the shaft having the threaded end, said sprocket having a frictional facing for engaging the worm gear secured on that shaft, a knob threaded upon the threaded end of the shaft and having a portion thereof extending outside of the housing, rotation of the knob in the same direction in which said threaded shaft is adapted to be rotated by the gear secured thereon causing it to travel axially along the shaft toward said gear and to bear against the clutch sprocket to move it axially along the shaft into frictional engagement with said gear, another sprocket secured on the supply reel spindle within the housing, positive drive means connecting said clutch sprocket and said supply reel spindle sprocket, a pulley secured within the housing on the shaft mounting the other of said worm gears, a second pulley within the housing secured to the takeup reel spindle, and a belt in frictional engagement with and connecting said pulleys.

7. A film transport means comprising a rotatable shaft having a worm secured thereon, a second rotatable shaft having a worm gear secured thereto, said worm gear being in mesh with the worm, means for driving said worm shaft, a supply reel spindle and a takeup reel spindle, a pulley secured on said second rotatable shaft, a second pulley secured to the takeup reel spindle, and frictional drive means connecting said pulleys, a rewind mechanism including a third rotatable shaft having a worm gear secured thereto, said second worm gear being in mesh with said worm and adapted to be driven in a direction opposite to that of said first worm gear, one end of said third shaft being threaded, a clutch rotatably mounted on said third shaft, the clutch adapted to frictionally engage the worm gear secured to said third shaft, a knob threaded upon the threaded end of that shaft, rotation of the knob in the same direction in which said threaded shaft is adapted to be driven by the gear secured thereto causing it to travel axially along the shaft toward said gear and to bear against the clutch to move it axially along the shaft into frictional engagement with said gear, and positive drive means connecting said clutch and said supply reel spindle.

8. A motion picture apparatus comprising a supporting structure, a shaft having a worm secured thereon journalled in the supporting structure, a second shaft having a worm gear secured thereon journalled in the supporting structure, said worm gear being in mesh with the worm, means for driving said worm shaft, a supply reel spindle and a takeup reel spindle journalled in the supporting structure, a pulley secured on said second shaft, a second pulley secured to the takeup reel spindle, and a belt in frictional engagement with and connecting said pulleys, a rewind mechanism including a third shaft having a worm gear secured thereon journalled in the supporting structure, said second worm gear being in mesh with the worm and adapted to be driven in a direction opposite to that of said first worm gear, one end of said third shaft being threaded, a clutch including a sprocket rotatably mounted on said third shaft and adapted to frictionally engage the worm gear secured to said third shaft, a knob threaded upon the threaded end of that shaft, rotation of the knob in the same direction in which said threaded shaft is adapted to be driven by the gear secured thereon causing it to travel axially along the shaft toward said gear and to bear against the sprocket to move it axially along the shaft into frictional engagement with the gear, a second sprocket secured to the supply reel spindle, and positive drive means connecting said clutch sprocket and said supply reel spindle sprocket.

9. A motion picture apparatus comprising a housing, a shaft journalled in a wall of the housing, a worm secured on the shaft within the housing, a second shaft journalled in a wall of the housing and having a worm gear secured thereon within the housing, said worm gear being in mesh with the worm, means for driving said first shaft, a supply reel spindle and a takeup reel spindle journalled in a wall of the housing and having reel receiving portions projecting outside of said housing, a pulley secured on said second shaft within the housing, a second pulley secured to the takeup reel spindle within the housing, and a belt in frictional engagement with and connecting said pulleys, a rewind mechanism including a third shaft journalled in a wall of the housing and having a worm gear secured thereon within the housing, said worm gear being in mesh with the worm and adapted to be driven in a direction opposite to that of said first worm gear, one end of said third shaft being threaded, a clutch including a sprocket rotatably mounted on said third shaft within the housing and adapted to frictionally engage the worm gear secured on said third shaft, a knob threaded upon the threaded end of that shaft and having a portion extending outside of the housing, rotation of the knob in the same direction in which said threaded shaft is adapted to be driven by the gear secured thereon causing it to travel axially along the shaft toward said gear and to bear against the sprocket to move it axially along the shaft into frictional engagement with the gear, a second sprocket secured to the supply reel spindle within the housing, positive drive means connecting said clutch sprocket and said supply reel spindle sprocket, and said second and third shafts having film sprockets secured thereon outside of the housing.

MILLER R. HUTCHISON, Jr.

REFERENCES CITED

The following references are of record in the file of this patent:

UNITED STATES PATENTS

| Number | Name | Date |
| --- | --- | --- |
| 2,193,031 | Lyman et al. | Mar. 12, 1940 |
| 2,196,738 | Nagel | Apr. 9, 1940 |
| 2,217,183 | Ross | Oct. 8, 1940 |